United States Patent
Lutter et al.

(10) Patent No.: US 12,385,514 B1
(45) Date of Patent: Aug. 12, 2025

(54) WEDGE LOCK WASHER PAIR AND TENSIONING ARRANGEMENT WITH SUCH WEDGE LOCK WASHER PAIR

(71) Applicant: Heico Befestigungstechnik GmbH, Ense (DE)

(72) Inventors: Frank Lutter, Welver-Stocklarn (DE); Stefan Vornweg, Werl (DE)

(73) Assignee: Heico Befestigungstechnik GmbH, Ense-Niederense (DE)

( * ) Notice: Subject to any disclaimer, the term of this patent is extended or adjusted under 35 U.S.C. 154(b) by 0 days.

(21) Appl. No.: 18/943,257

(22) Filed: Nov. 11, 2024

(30) Foreign Application Priority Data

Feb. 9, 2024 (DE) .................. 20 2024 100 648.8
Sep. 19, 2024 (DE) .................. 20 2024 001 799.0

(51) Int. Cl.
*F16B 39/24* (2006.01)
*F16B 39/282* (2006.01)

(52) U.S. Cl.
CPC ............ *F16B 39/24* (2013.01); *F16B 39/282* (2013.01)

(58) Field of Classification Search
CPC ........................................ F16B 39/24
USPC ................................. 411/149, 161
See application file for complete search history.

(56) References Cited

U.S. PATENT DOCUMENTS

| | | |
|---|---|---|
| 299,977 A | 6/1884 | Garvey |
| 625,529 A | 5/1899 | Andress |
| 684,673 A | 10/1901 | Clark |
| 2,069,402 A | 2/1937 | Cowlin |

(Continued)

FOREIGN PATENT DOCUMENTS

| | | |
|---|---|---|
| CN | 105317815 A | 2/2016 |
| CN | 105782216 A | 7/2016 |

(Continued)

OTHER PUBLICATIONS

U.S. Appl. No. 18/943,327, filed Nov. 11, 2024 by applicant Heico Befestigungstechnik GMBH [Copy not provided per MPEP 609.04(a)(II) since available in the USPTO electronic system].

(Continued)

*Primary Examiner* — Flemming Saether
(74) *Attorney, Agent, or Firm* — Polson Intellectual Property Law P.C.; Margaret Polson; Christopher Sylvain

(57) ABSTRACT

A pair of wedge lock washers with a first wedge lock washer and with a second wedge lock washer. The two washers each have a fastener opening arranged in alignment with one another, a wedge surface structure which engages with one another on their mutually facing surfaces, and clamping structures on their surfaces facing away from one another. One of the two washers has a larger outer diameter than the other washer, and has a rotary drive contour on the radial outside for torque support of a clamping tool. The clamping structures of the washer with the larger diameter are arranged at an axial distance from the disk surface in the inner disk area thereof and are designed for the form-fitting embossing of the same into the surface of a component adjacent thereto. The apexes of the wedge surface structuring are located as positive structures on the mutually facing surfaces of the wedge lock washers in a respective plane. The planes of the disk surfaces of the wedge lock washer with the smaller diameter are arranged parallel to one another.

15 Claims, 5 Drawing Sheets

(56) References Cited

U.S. PATENT DOCUMENTS

| | | | |
|---|---|---|---|
| 2,271,732 A | 2/1942 | Chappuis | |
| 3,077,218 A * | 2/1963 | Ziegler | F16B 39/24 411/161 |
| 3,263,727 A | 8/1966 | Herpolsheimer | |
| 3,329,190 A * | 7/1967 | Oldenkott | F16B 39/24 411/149 |
| 3,417,802 A * | 12/1968 | Oldenkott | F16B 43/009 411/959 |
| 3,923,406 A | 12/1975 | Iritz | |
| 4,377,361 A | 3/1983 | Frieberg | |
| 4,538,313 A * | 9/1985 | Frieberg | B21D 53/20 470/42 |
| 4,793,752 A * | 12/1988 | Frieberg | F16B 39/24 411/161 |
| 4,880,343 A | 11/1989 | Matsumoto | |
| 5,011,351 A * | 4/1991 | Terry | F16B 39/24 411/161 |
| 5,072,917 A | 12/1991 | Pleva | |
| 5,090,855 A | 2/1992 | Terry | |
| 5,626,449 A | 5/1997 | McKinlay | |
| 5,984,602 A | 11/1999 | Park | |
| 6,039,524 A | 3/2000 | McKinlay | |
| 6,347,915 B1 | 2/2002 | Balzano | |
| 6,776,565 B2 * | 8/2004 | Chang | F16B 39/282 411/149 |
| 7,192,232 B2 * | 3/2007 | Esser | F16B 39/24 411/164 |
| 7,497,653 B2 | 3/2009 | Harris | |
| 8,303,357 B2 | 11/2012 | Kuwahara | |
| 8,459,919 B2 * | 6/2013 | Ehrler | F16B 39/26 411/533 |
| 8,631,724 B2 | 1/2014 | Miyata | |
| 9,435,368 B2 | 9/2016 | Stewart | |
| 9,636,738 B2 | 5/2017 | Andersson | |
| 10,107,325 B2 | 10/2018 | Davis | |
| 10,816,030 B2 | 10/2020 | Chang | |
| 11,225,994 B2 | 1/2022 | Lutter | |
| 11,242,884 B2 | 2/2022 | Mohan | |
| 11,396,902 B2 | 7/2022 | Davis | |
| 2003/0190218 A1 | 10/2003 | Andersson | |
| 2004/0047706 A1 | 3/2004 | Chang | |
| 2004/0096289 A1 * | 5/2004 | Bydalek | F16B 39/24 411/161 |
| 2007/0196195 A1 | 8/2007 | Lin | |
| 2008/0014046 A1 * | 1/2008 | Bauer | F16B 43/00 411/164 |
| 2009/0103998 A1 * | 4/2009 | Gagneur | F16B 39/108 411/196 |
| 2013/0139502 A1 | 6/2013 | Chu | |
| 2013/0170922 A1 | 7/2013 | Persson | |
| 2014/0037399 A1 * | 2/2014 | Hyatt | F16B 43/009 470/42 |
| 2014/0377032 A1 * | 12/2014 | Delcher | F16B 39/24 411/149 |
| 2015/0204374 A1 | 7/2015 | Stewart | |
| 2016/0003287 A1 * | 1/2016 | Andersson | F16B 39/24 411/533 |
| 2016/0375563 A1 | 12/2016 | Junkers | |
| 2017/0021478 A1 | 1/2017 | Junkers | |
| 2017/0122361 A1 * | 5/2017 | Davis | B25B 23/0078 |
| 2018/0231048 A1 * | 8/2018 | Liu | F16B 39/24 |
| 2019/0003513 A1 | 1/2019 | Junkers | |
| 2019/0120275 A1 | 4/2019 | Junkers | |
| 2019/0120281 A1 * | 4/2019 | Lutter | F16B 39/24 |
| 2019/0178282 A1 * | 6/2019 | Davis | F16B 39/282 |
| 2019/0178284 A1 | 6/2019 | Davis | |
| 2019/0234447 A1 * | 8/2019 | Chang | F16B 39/282 |
| 2021/0079946 A1 * | 3/2021 | Mohan | F16B 39/24 |
| 2021/0095710 A1 | 4/2021 | Junkers | |
| 2021/0372442 A1 | 12/2021 | Junkers | |
| 2024/0018991 A1 | 1/2024 | Knechtges | |
| 2024/0309906 A1 | 9/2024 | Davis | |

FOREIGN PATENT DOCUMENTS

| | | |
|---|---|---|
| DE | 202012103313 U1 | 1/2014 |
| DE | 202012104410 U1 | 3/2014 |
| DE | 202019106592 U1 | 1/2020 |
| DE | 202019104561 U1 | 1/2021 |
| GB | 2136077 A | 9/1984 |
| WO | 2015100115 A2 | 7/2015 |
| WO | 2016176518 A2 | 11/2016 |

OTHER PUBLICATIONS

International Search Report (ISR) of the International Searching Authority (ISA/EP) dated Apr. 23, 2025 in related international application PCT/EP2025/052168.

Written Opinion (WO) of the International Searching Authority (ISA/EP) dated Apr. 23, 2025 in related international application PCT/EP2025/052168.

\* cited by examiner

WEDGE LOCK WASHER PAIR AND TENSIONING ARRANGEMENT WITH SUCH WEDGE LOCK WASHER PAIR

RELATED APPLICATION

This application claims priority to German applications DE 20 2024 100 648.8 filed Feb. 9, 2024 and DE 20 2024 001 799.0 filed Sep. 19, 2024, which are incorporated-by-reference herein.

BACKGROUND

The disclosure relates to a pair of wedge lock washers with a first wedge lock washer and with a second wedge lock washer, which two wedge lock washers each have a fastener opening arranged in alignment with one another, and on their surfaces facing one another each have a wedge surface structure which engages with one another, and on their surfaces facing away from one another have clamping structures, wherein one of the two wedge lock washers has a larger outer diameter than the other wedge lock washer and has a rotary drive contour on the radial outside for torque support of a clamping tool, wherein the clamping structures of the wedge lock washer with the larger diameter are arranged at least in a radially outer disk area extending in the radial direction at an axial distance from the disk surface in the inner disk area and are designed for the form-fitting embossing of the same into the surface of a component resting thereon.

Wedge lock washers are used as anti-loosening devices, particularly for securing complex screw connections. While the clamping structures designed as radial ribs on the surfaces of the two wedge lock washers facing away from each other serve the purpose of increasing friction on the respective counter support surface, for example the underside of a screw head or the surface of an object in the loosening direction, the wedge surfaces of the wedge surface structuring facing each other on the opposite surfaces of the wedge lock washers serve to prevent self-loosening. This is possible because the pitch of the wedge surfaces is designed to be the same as the pitch of the thread of a screw as a screw fastener, but with a larger pitch angle. Due to the increased frictional resistance in the release direction between the pair of wedge lock washers and the respective counter support, only one movement is possible between the two disks, which, however, is blocked due to the orientation and inclination of the wedge surfaces with respect to self-release movements.

Such pairs of wedge lock washers are particularly suitable for securing dynamically stressed screw connections, since the height of the interlocking wedge surfaces of the two washers means that the desired locking function is maintained for much longer than when using other locking systems. The same applies to screw connections that are subject to thermal length changes.

The above-described functioning of such a pair of wedge lock washers is particularly safe when the clamping structures on the side facing the surface of the component are pressed into the surface material of this component in a form-fitting manner in the circumferential direction of the washer. It is important that this form-fitting connection is maintained even under mechanical and/or thermal loads to which the pair of wedge lock washers is exposed when part of a clamping arrangement. In order to improve the stability of the above-described form fit between the pair of wedge lock washers and the component that is in contact with and thus clamped, over the period of use, a pair of wedge lock washers has been proposed in DE 20 2012 103 113 U1, in which at least one of the two wedge lock washers of equal diameter, typically at least the one that is in contact with the surface of the component with its clamping structures, is designed in the manner of a disk spring. In order to implement the principle described in this prior art, it is necessary that one or both of the wedge lock washers, designed in the manner of a disk spring, are made of spring steel. Due to the nature of the material, machining spring steel to create the required structures on the flat sides is much more complex than producing a conventional pair of wedge lock washers, where the wedge lock washers are not made of spring steel.

US 2019/0178284 A1 discloses a pair of wedge lock washers with one of the two wedge lock washers having a larger diameter than the other. The wedge lock washer, which has a larger diameter, has a radial external toothing, which provides a rotary drive contour for the torque-locking engagement of a torque support of a clamping tool. This pair of wedge lock washers is designed like a reaction washer. In principle, this wedge lock washer is also designed like a disk spring. Both flat sides are conically tapered towards the fastener opening. This means that the wedge surface structures as well as the clamping structures are located on conical disk surfaces. With regard to the upper surface of the disk carrying the clamping structures, this serves the purpose of ensuring that, before clamping, only the radially outer disk area with its clamping structures located thereon rests on the surface of the component to be clamped. The arrangement of the clamping structures of the smaller diameter wedge lock washer on its counter bearing is reversed. In the case of the smaller diameter wedge lock washer, only the inner disk area with the clamping structures located on it rests on the surface of a counter bearing, for example a clamping nut or the underside of the head of a clamping bolt. This means that during the clamping of the clamping arrangement in which this pair of wedge lock washers is inserted, first the clamping structures of the outer disk area of the wedge lock washer with the larger diameter are pressed into the surface of the component and then this wedge lock washer is adjusted like a disk spring so that, in the clamping position, this wedge lock washer rests with its entire intended disk surface on the surface of the component. The wedge lock washer with a smaller diameter does not have any clamping structures on its surface facing away from the wedge lock washer with a larger diameter, which are intended to create a positive connection. These structures are wedge-shaped, wherein the apex of these wedge surfaces points in the tensioning direction and thus opposing a release movement. The positive structures formed by this structuring are flat over a section in the circumferential direction. Due to the conicity of their two opposing surfaces, these wedge lock washers cannot be easily manufactured, at least not using a simple, cost-effective stamping and pressing process.

One-piece reaction washers are also known. One-piece reaction washers, which do not have the advantages of a pair of wedge lock washers described above, are made from relatively thick steel plates in order to apply the required force to the surface. These can only be punched with difficulty, if at all possible, and formed by pressing to produce the structures.

The foregoing examples of related art and limitations therewith are intended to be illustrative and not exclusive. Other limitations will become apparent to those skilled in the art upon a reading of the specification and a study of the drawings.

SUMMARY

The following embodiments and aspects thereof are described and depicted in conjunction with systems, tools, and methods which are meant to be illustrative and not limiting in scope. In various embodiments, one or more problems have been reduced or eliminated, while other embodiments are directed to other improvements.

Proceeding from this background, one aspect of the disclosure is to propose a pair of wedge lock washers which is easier and more cost-effective to produce in view of US 2019/0178284 A1, and which also allows additional application possibilities.

According to one embodiment, this may be achieved by a pair of wedge lock washers of the type mentioned at the beginning, in which the apexes of the wedge surface structuring are located as positive structures on the surfaces of the wedge lock washers facing each other in one plane and the planes of the disk surfaces of the wedge lock washers with a smaller diameter are arranged parallel to each other.

In this pair of wedge lock washers, the apexes are arranged as positive structures of the wedge surface structuring of the mutually facing surfaces of the two wedge lock washers in their extension in the radial direction in one plane. The wedge surfaces are also not inclined in the radial direction. In the smaller diameter wedge lock washer, the two disk surfaces are arranged parallel to each other. The disk side of the larger diameter wedge lock washer that carries the clamping structures has a radially outer disk area that is spaced apart from the inner disk area in the axial direction. This means that this wedge lock washer has an overall greater material thickness in its outer disk area than in its inner disk area, which typically borders the fastener opening. This means that when this wedge lock washer is in contact with the surface of a component without being clamped to it, it only rests on this outer disk area. When the wedge lock washers pair is tightened, this means that the clamping structures located on this outer disk area are first embossed into the surface material of the component. During clamping, the clamping force is concentrated on these clamping structures located in the outer disk area, which is why they are pressed or impressed into the surface of the component even when a relatively low clamping force is applied. The desired form fit in the circumferential direction of the wedge lock washer is therefore formed very early during clamping, which has a positive effect on the handling of a clamping tool which, with a torque arm, rests positively on the radially outer rotary driving contour or engages in it. The anti-twisting protection caused by the form fit between this wedge lock washer and the component adjacent to it is effective and resilient even with only a slight engagement of the clamping structures of this outer disk area in the surface of the component due to its typically greatest possible distance from the axis of rotation. The above-described design of the side of the larger-diameter wedge lock washer carrying the clamping structures can be realized when radial ribs are provided, for example, by having a greater height in the radially outer disk area than in the inner disk area. The base surface of this side of the wedge lock washer, i.e., the surface on which the negative structure of the clamping structures is arranged, is a plane.

In addition or as an alternative to the above-described design of the radial ribs, whereby with increasing clamping force a greater extent of the radial ribs is pressed into the counter bearing, this can also be achieved by a first number of radial ribs having a first height and a second number of radial ribs having a second height, wherein the second height is less than the first height, and in which the radial ribs of the first number are separated from one another individually or in groups by at least one radial rib of the second number.

In a lock washer designed in this way, the radial ribs are designed with different heights in the circumferential direction. A first number of radial ribs have a first height, while a second number of radial ribs have a second height, but less than the first height. The height of a radial rib is determined by the distance of the highest point of such a radial rib from the adjacent depression. The deepest recess separating the two radial ribs is preferably located in a common disk plane. One or more radial ribs of the first number are arranged in an alternating sequence with one or more radial ribs of the second number, so that the flat side of the lock washer having the clamping structure rests uniformly on the surface of an adjacent part, for example a first component of a clamping arrangement. Because only a subset of the radial ribs rests on the surface of the component adjacent to the lock washer at the beginning of a clamping process, the clamping force caused by the applied torque is concentrated on this subset of the radial ribs. These can therefore be pressed into the surface of the adjacent part even with a significantly lower clamping force acting on the lock washer, compared to a conventional design of such a lock washer, in which the radial ribs all have the same height in the circumferential direction. The radial ribs of the second number or, in the event that the second number of radial ribs in turn has radial ribs of different heights, those with the greatest height of this number are only pressed into the surface of the adjacent part when the radial ribs of the first number have already formed a positive connection with the adjacent component, wherein they have been pressed in so far that when a higher clamping force is applied, the next higher radial ribs of the second number are also pressed into the material to reinforce the positive connection. As the clamping force increases, the form fit is increased via an increasing number of radial ribs. With such a lock washer, the entire radial extension of the flat side of the lock washer can be used to form the radial ribs and thus for the form fit. This form fit formed in the circumferential direction of the lock washer is much more effective than a form fit formed by radial ribs, which only extend over a rather smaller section of the radial extension of the lock washer. As a result of separating the radial ribs or grouped radial ribs of the first number from one another by interposing one or more radial ribs of the second number, the risk of shearing off material of the adjacent part when a corresponding loosening torque is applied is significantly reduced.

A particular advantage of this type of clamping structure of a flat side of the lock washer is that additional radial ribs can be used in several steps, successively with increasing clamping force, to achieve the desired form fit with the part adjacent to the clamping structure. It is entirely possible that, in addition to the radial ribs of the first number having their greatest height, radial ribs of the second number having a stepped height (as seen in the circumferential direction) can be provided between the radial ribs of the first number. In such a configuration, a radial rib of the first number is followed in the circumferential direction by a radial rib of the second number, namely, one which has a greatest height of the radial ribs within the second number. This in turn may be followed by another radial rib of the second number, which has a lower height than the one preceding it in the sequence. With such a stepped design, care is taken that the radial ribs with a lower height are only used for the form closure when the radial ribs with the greater height have already been pressed into the adjacent part with a certain penetration depth. In this way, with increasing clamping force and thus with higher torque acting on the clamping device, for example a bolt head or a nut, the form fit is improved by increasingly more radial ribs that are pressed into the adjacent material. At the same time, the penetration depth of the radial ribs, which have a greater height, is increased.

The height differences between the different heights of the radial ribs do not need to be excessively large. Even a height difference of a few hundredths of a millimeter, for example $^2/_{100}$-$^3/_{100}$ mm, is sufficient to enjoy the advantages of this lock washer.

The clamping structure of this lock washer can be specifically adapted to the securing purpose to be achieved. For example, the number of radial ribs of the first number may be less than that of the radial ribs of the second number. In this way, the necessary force can be easily adjusted with which the lock washer is pressed into the material in contact with it in order to achieve an initial positive connection and to avoid rotation during clamping. The height difference between the radial ribs of the first number can also be greater than the height difference of radial ribs of the second number if radial ribs with different heights are combined in this second number.

If the second number of radial ribs comprises ribs of different heights, the sequence of the radial ribs differing in height may be designed to be the same in both circumferential directions of the lock washer.

In principle, it is preferred that the radial ribs with their different heights are evenly distributed in the circumferential direction on the flat side of the lock washer that carries the clamping structure.

The radial ribs may have a straight course in the radial direction. It is also possible that the radial ribs have an apex directed in the securing direction in their radial extension, for example that they are curved in this direction. Examples of the geometry of such clamping structures are disclosed in applicant's DE 20 2012 104 410 U1 which are incorporated-by-reference into this disclosure with regard to their geometry.

The clamping structure of the smaller diameter wedge lock washer is designed to provide an increase in friction at least in the release direction of a clamping counter bearing.

The two wedge lock washers of the wedge lock washers pair described above do not need to be made of excessively thick material. The force is distributed from a counter bearing, for example a clamping nut, via the second wedge lock washer with a smaller diameter to the wedge lock washer with a larger diameter. Due to their simple geometry, each of the two wedge lock washers can be separated from a blank by punching. The punching not only forms the fastener opening, but also the radially outer rotary drive contour of the wedge lock washer with a larger diameter. It is just as easy to cut the wedge lock washer blank out of a blank sheet by laser cutting. Therefore, laser cutting is understood to be equivalent to a punching process and the term punching in the context of this disclosure. According to a preferred embodiment, the structuring of the two flat sides is produced by pressing technology, for example by means of a press equipped with appropriate forming tools. It is worth mentioning that the difference in the total material thickness of the larger diameter wedge lock washer between its radially outer disk area and the radially inner disk area need only be small. Even a few hundredths of a millimeter are considered sufficient. The dimensioning of the axial distance of the outer disk area from the radial inner disk area also depends on the total diameter of this wedge lock washer and thus the diameter of the screw fastener with which the pair of wedge lock washers is tightened.

After the flat sides of the disk blanks have been embossed, they are typically hardened by heat treatment.

Preferably, the clamping structures, which are typically designed as radial ribs, in the outer disk area have a constant axial distance from the inner disk area with respect to the course of their apex. The torque is then fixed by impressing these sections of the clamping ribs, which have a certain longitudinal extension, into the material of the component from the beginning of the clamping process with an even stronger form fit.

The wedge lock washer with a larger diameter can be made with a relatively small material thickness, should this be desired, if the wedge lock washer with a smaller diameter has an outer diameter that reaches up to the radially outer disk area of the disk with a larger diameter at its axial distance from the inner disk area. Therefore, the larger diameter wedge lock washer can have a significantly lower material thickness compared to a one-piece reaction washer.

The outer disk area of the larger diameter wedge lock washer with its axial distance to the inner disk area can take up 25 to 45% of the radial disk extension, starting from the edge of the fastener opening, and typically extends to the radially outer disk end.

According to a preferred embodiment, the clamping structures of the two wedge lock washers, which are typically designed as radial ribs, extend from the edge region surrounding the fastener opening to the region of the radially outer end. Radial ribs as clamping structures are preferably designed with an asymmetrical cross-sectional geometry, with the flatter flanks oriented in the opposite direction to the wedge surfaces structuring the opposite disk surface.

In order to ensure that the two wedge lock washers are connected to one another until such a pair of wedge lock washers is used, one embodiment provides that these two wedge lock washers are connected to one another by an adhesive connection in the delivery state. Such an adhesive connection, typically designed as an adhesive bond, is designed in such a way that it is flexible or loosened under a shear load and thus under a torque acting on a wedge lock washer. This is done against the background that the desired rotational mobility of the two wedge lock washers against each other and thus the resulting anti-rotation functionality is not impaired.

The design of the pair of wedge lock washers described above also represents an assembly coding due to the wedge lock washers having different diameters, which is not the case with one-piece reaction washers. The outer edge of the wedge lock washer with a smaller diameter can be clearly felt or grasped when handled manually, so that a fitter can mount the pair of wedge lock washers either with the outside of the larger diameter wedge lock washer or with the outside of the smaller diameter wedge lock washer in contact with the component to be clamped, depending on the desired assembly application. Due to the special design of this pair of wedge lock washers, incorrect assembly, which would lead to a nonfunctional clamping connection in the case of a pair of wedge lock washers known from US 2019/0178284 A1, is ultimately avoided. In many applications, the pair of wedge lock washers will be mounted with the larger diameter wedge lock washer in contact with the component to be clamped.

Even if such a pair of wedge lock washers is mounted in the reverse arrangement of its two wedge lock washers, so that the outside of the wedge lock washer with the smaller diameter rests against the surface of the component, a proper clamping can be carried out in which the clamping structures of the wedge lock washer with the smaller diameter, which are also typically designed as radial ribs, are embossed into the material of the component over their radial extension. With such an arrangement, in essence, the only thing that has to be taken into account is that the torque required for loosening is greater than that required for tightening. This can be advantageous for some applications, which is why the functionality and therefore the intended use is increased by the possibility of using this pair of wedge lock washers in both mounting options.

In addition to aspects and embodiments described above, further aspects and embodiments will become apparent by reference to the drawings, wherein like reference numerals generally designate corresponding structures in the several views.

BRIEF DESCRIPTION OF THE DRAWINGS

The description below is provided with reference to the attached figures, where.

Figure 1:
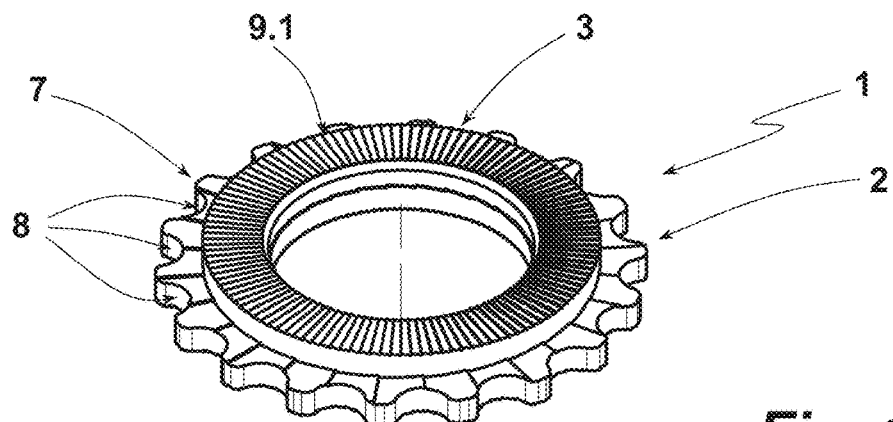
FIG. 1 shows a perspective view of one example pair of wedge lock washers according to the disclosure.

It is to be understood that the invention is not limited in application to the details of particular arrangements shown in the drawings, since the invention is capable of other embodiments. Embodiments and figures disclosed herein are to be considered illustrative rather than limiting.

DETAILED DESCRIPTION

Figure 2:
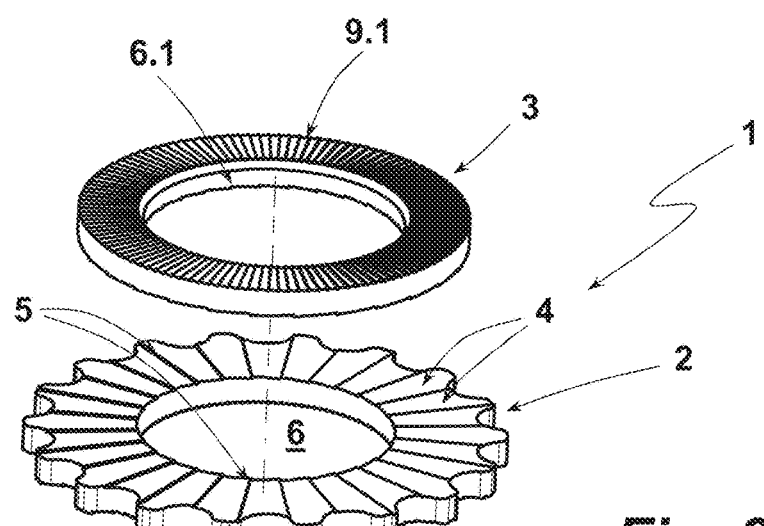
FIG. 2 shows an exploded perspective view of the pair of wedge lock washers.
Figure 3:
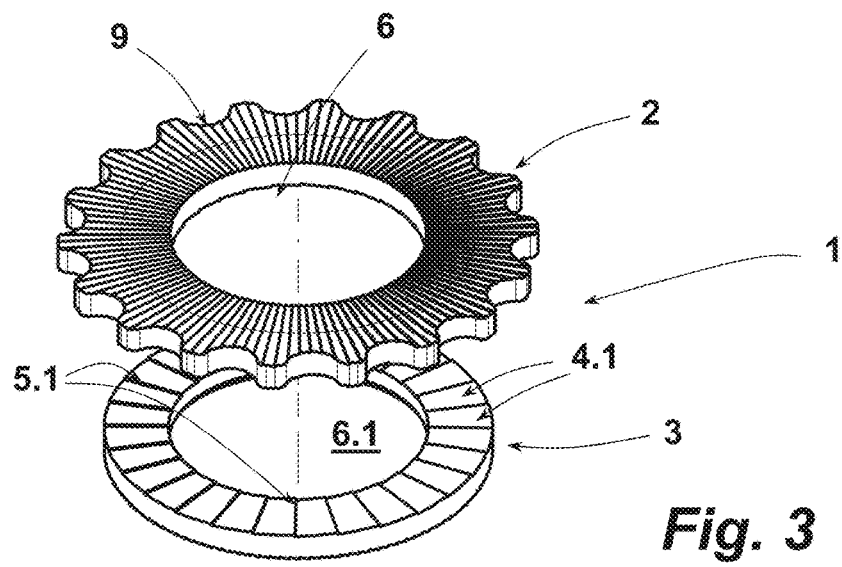
FIG. 3 shows another exploded perspective view of the pair of wedge lock washers from the other side.

With reference to FIG. 1, a pair of wedge lock washers 1 has two individually manufactured wedge lock washers 2, 3. Each of the two wedge lock washers 2, 3 has, on its side facing the other wedge lock washer 3 or 2, the wedge surface structure with wedge surfaces 4, 4.1 typical for such wedge lock washers (see also FIGS. 2 and 3). The wedge surfaces 4, 4.1 extend over the entire radial extent of the respective wedge lock washer 2, 3. The wedge surface structuring of the two wedge lock washers 2, 3 is designed as is known for wedge lock washers. The wedge surface structure is not tapered in the radial direction. The orientation of the wedge surfaces 4, 4.1 is designed such that the short flanks abut each other in the clamping direction (here: clockwise). The apexes 5, 5.1 formed by the wedge surface structuring as positive structures of the wedge surface structuring are each located in one plane with respect to their radial extension. Both wedge lock washers 2, 3 have a fastener opening 6, 6.1. The two wedge lock washers 2, 3 are connected to one another by an adhesive bond with respect to their fastener opening 6, 6.1, with their wedge surfaces 4, 4.1 facing one another and in the position shown in FIG. 1 in the illustrated example. The adhesive bond is designed to give way or break under shear stress. Such a shear stress occurs when at least one of the two wedge lock washers 2, 3 is moved against the clamping direction. This means that the wedge lock washer functionality is retained despite the adhesive connection of the two wedge lock washers 4, 4.1.

The wedge lock washer 2 has a larger outer diameter than the wedge lock washer 3. Its outer radial end is structured by a rotary driving contour 7. The rotary drive contour 7 of the example embodiment is designed in the manner of a toothing. The negative structures or recesses 8 serve to engage a torque support of a clamping tool. The wedge lock washer 2 therefore takes on the functionality of a reaction washer. Reaction washers are known per se and therefore do not need to be explained in more detail in this context.

Both wedge lock washers 2, 3 each have clamping structures 9, 9.1 on their flat sides facing away from each other. In the embodiment shown, these clamping structures 9, 9.1 are radial ribs, and in the embodiment shown, they have an asymmetric cross-sectional geometry. The flatter flanks of these radial ribs are aligned in the opposite direction to the wedge surfaces 4, 4.1 on the other side of the disk. While the clamping structures 9, at least a section thereof, of the wedge lock washer 2 serve the purpose of being pressed into and thus impressed into the material surface of the component adjoining thereto when clamping a clamping arrangement into which the pair of wedge lock washers 1 is inserted, the clamping structures 9.1 of the wedge lock washer 3 serve to provide friction-increasing means by which a loosening of the clamping or abutment, i.e., a clamping nut or a bolt head, is made more difficult. This does not exclude the possibility that these can also be embossed into the material of the counter bearing.

In the wedge lock washer 3, which is the smaller diameter washer in the embodiment shown, the two flat sides are arranged in parallel planes. This means that the clamping structures 9.1 have the same height over their radial extension.

Figure 5:
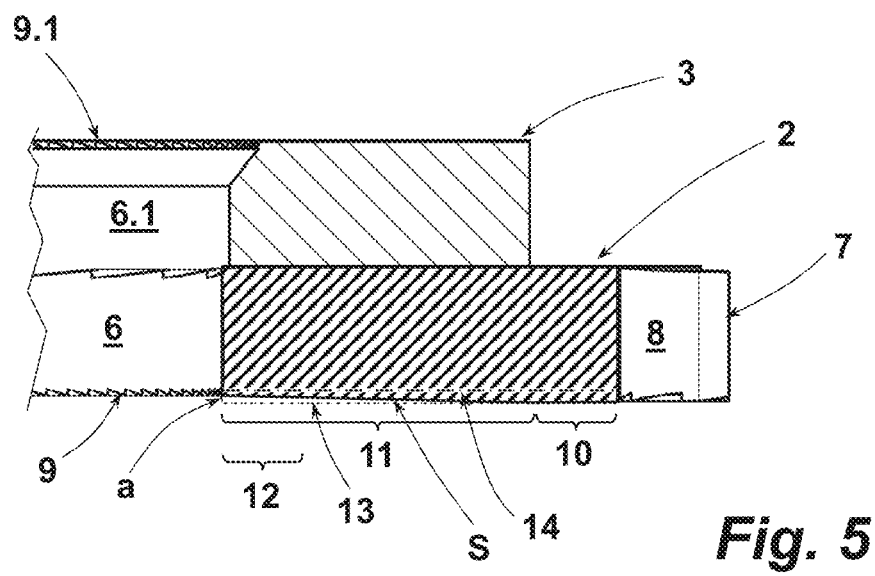
FIG. 5 shows an enlarged view of the detail of FIG. 4.

Even if the apexes 5 of the wedge surface structure of the wedge lock washer 2, which is the larger one in diameter in the embodiment shown, lie in one plane, the opposite flat side of this wedge lock washer 2 is designed differently with regard to the height of the clamping structures 9 in the radial direction. The height of the radial ribs serving as clamping structures 9 decreases in the radial direction from the outside to the inside in the direction of the fastener opening 6. This is shown in the detailed illustration of FIG. 5. In an outer radial disk area 10, the height of such a radial rib is constant. In this figure, the apex of the radial rib shown in section is marked with the reference symbol S. In the disk area 11 adjacent to the disk area 10 in the radial direction on the inside, the height of the radial ribs decreases in the direction of the fastener opening 6. Thus, the outer radial disk area 10 is located at a small but certain axial distance (distance in the axial direction) from the inner disk area 12. This distance is marked with "a" in this figure. If the wedge lock washer 2 with its clamping structure 9 contacts the surface of a component, it only rests on the surface of the component with the radially outer disk area 10. In FIG. 5, this disk area 10 ends in the radial outward direction due to the position of the section shown in the apex of a negative structure 8 of the rotary drive contour 7. In the sections of the wedge lock washer 2 in which the positive structures or protrusions of the rotary drive contour 7 are arranged, this outer disk area 10 extends into the area of the radially outer end of the wedge lock washer 2.

In FIG. 5, the dashed line 13 indicates the trace of the continuation of the section of the apex S of the radial rib shown, which is located at the same height within the radially outer disk area 10. The depth line of the radial rib is also shown in this figure with a dash-dotted line 14; thus, line 14 defines the virtual disk surface that remains unstructured.

Figure 4:
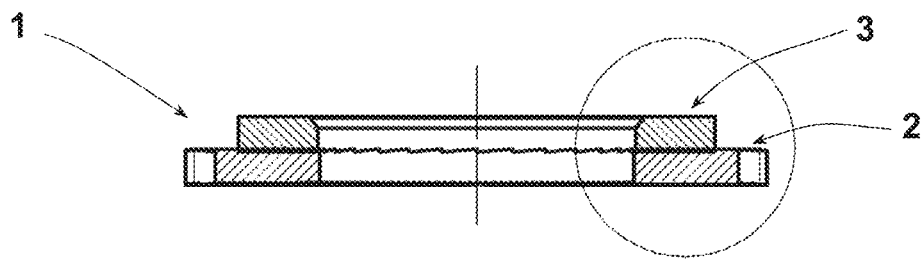
FIG. 4 shows a cross-sectional side view of the pair of wedge lock washers.

It can be seen from the sectional views in FIGS. 4 and 5 that the radial extension of the smaller diameter wedge lock washer 3, starting from the fastener openings 6, 6.1 arranged in alignment with one another, extends approximately to the radial extension of the region 11 of the wedge lock washer 2 and thus reaches approximately to the radially outer disk area 10.

Both wedge lock washers 2, 3 are made of a steel material. At least the two flat sides, but typically the entire wedge lock washers 2, 3, are provided with a zinc flake coating. The two wedge lock washers 2, 3 are punched out of a blank sheet in a first manufacturing step. The punching process provides the external shape of the two wedge lock washers 2, 3. This also includes the provision of the fastener openings 6, 6.1. The structuring of the flat sides is carried out by a subsequent pressing process, wherein the structuring on both flat sides of each wedge lock washer 2, 3 is produced in a single pressing step. This is done in a press equipped with appropriate forming tools. As a result, the surface material of the punched-out press blank is reshaped in order to form the wedge surface structuring on one flat side and the respective clamping structures 9, 9.1 on the other flat side. This forming leads to a work hardening of the structures produced, which is particularly advantageous for the clamping structures 9, 9.1, since these are not only formed by this forming process, but are also hardened compared to the remaining material of the respective wedge lock washer 2, 3. Naturally, the zinc flake coating was only applied to each wedge lock washer 2 or 3 after the molding was completed. In the embodiment shown, the disks structured by embossing have been hardened by heat treatment. The pane is thus hardened as a whole and has been brought to a hardness that significantly exceeds that which can be achieved solely by work hardening. In a subsequent step, the two wedge lock washers 2, 3 were each bonded together by an adhesive connection with their flat side bearing the wedge surface structure facing each other.

Figure 6:
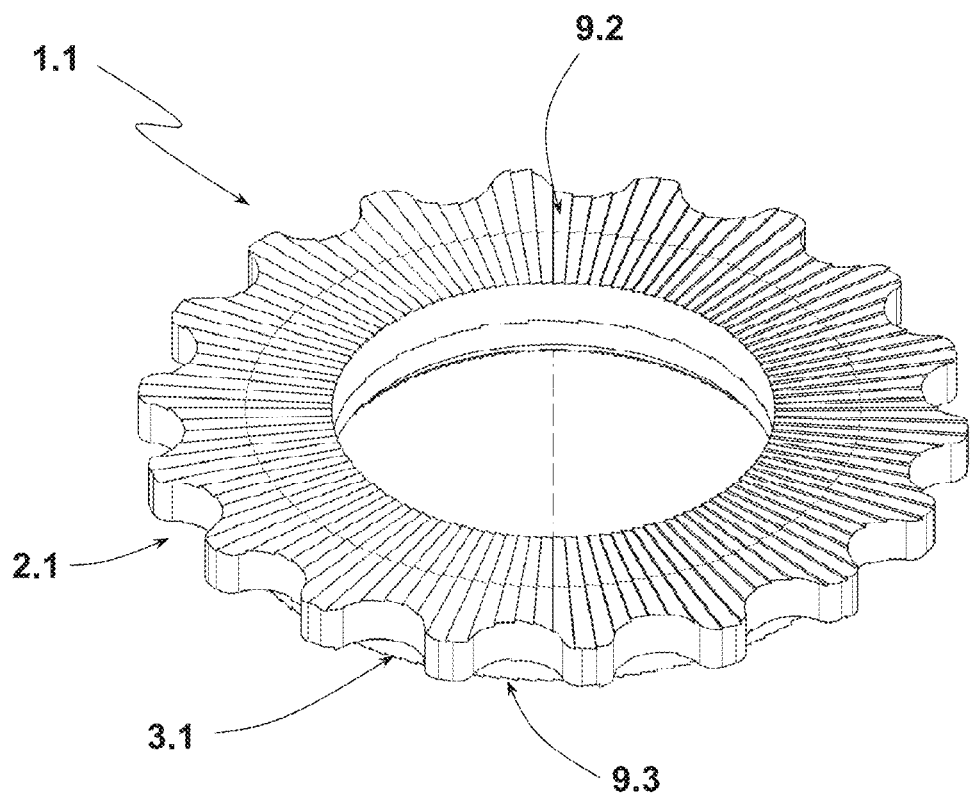
FIG. 6 shows a perspective view of another example pair of wedge lock washers according to the disclosure.
Figure 7:
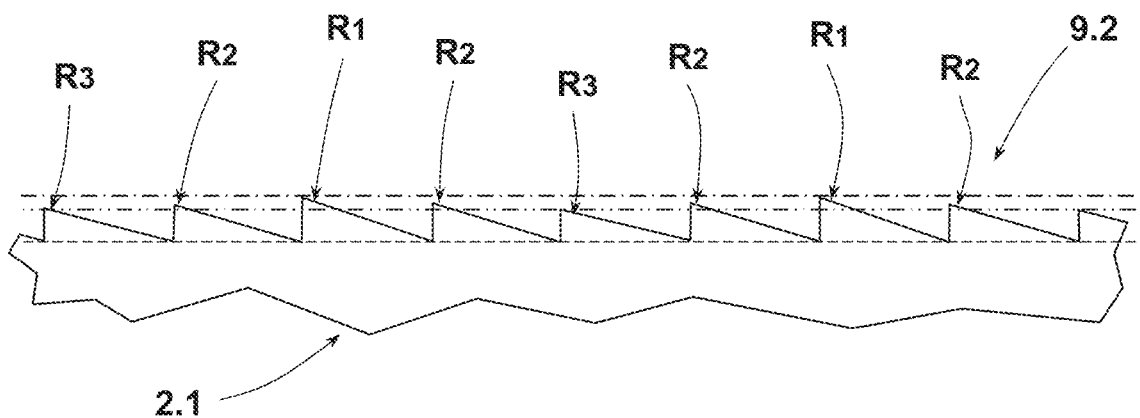
FIG. 7 shows an enlarged side partial view of the upper lock washer of FIG. 6.

FIG. 6 shows another pair of wedge lock washers 1.1, which is basically constructed like the pair of wedge lock washers 1 of the previous figures. The pair of wedge lock washers 1.1 differs from the pair of wedge lock washers 1 only in the design of the radial ribs serving as clamping structures 9.2, 9.3 on the surfaces of the two wedge lock washers 2.1, 3.1 facing away from each other. The clamping structure 9.2 of the larger diameter wedge lock washer 2.1 is explained below. The clamping structure 9.3 of the smaller diameter wedge lock washer 3.1 is designed in the same way; only the shorter flank of this clamping structure 9.3 points in the opposite direction. The clamping structure 9.2 is formed by radial ribs R1, R2, R3 of different heights. The radial ribs R1 are those with the greatest height. The height of the radial ribs R1 is indicated in FIG. 7 by the dash-dot-dash line. The outer end of the radial ribs R1 is located in a common disk plane. The radial ribs R2, R3 belong to a second number or group of radial ribs having a lower height. The second number of radial ribs is divided into the radial ribs R2 and R3, wherein these radial ribs R2, R3 have a different height from each other. The radial ribs R2, R3 of the second number have a lower height than the radial ribs R1. The radial ribs R2 have the greater height of the group of radial ribs of the second number. The height of the radial ribs R1, R2, R3 is measured from the common base (shown by the dashed line in FIG. 7). Thus, the lowest point lies between two adjacent radial ribs in a common disk plane. The detail of a side view of the lock washer 2 in FIG. 7 shows that adjacent to a radial rib R1 in both directions, there is arranged a radial rib of the second number, namely a radial rib R2. This is followed in the circumferential direction by a radial rib R3, thus a radial rib with the smallest height. This sequence of alternation is the same in both directions in the circumferential direction and extends over the entire circumference of the wedge lock washer 2. To illustrate the height difference, the height level of the radial ribs R3 is also indicated in FIG. 7 by the dash-dot-dot line).

In the wedge lock washer 3.1, which is the smaller diameter wedge lock washer in the embodiment shown, the two flat sides are arranged in parallel planes. This means that the clamping structures 9.3 have the same height over their radial extension.

Figure 8:
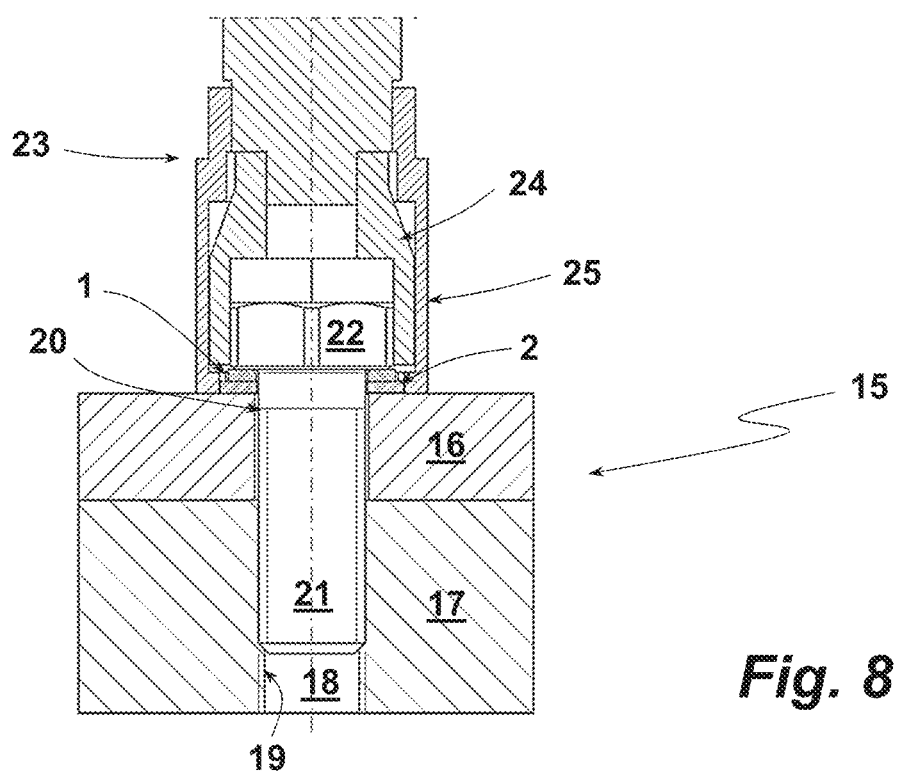
FIG. 8 shows the pair of wedge lock washers of FIG. 1 used as part of an example clamping arrangement with a clamping tool for clamping the clamping arrangement.

FIG. 8 shows the pair of wedge lock washers 1 as part of a clamping arrangement 15. In the clamping arrangement 15 shown as an example, two components 16, 17 are to be clamped together. Both components 16, 17 have fastening holes that are aligned with each other. In the illustrated embodiment, the component 17 has a blind bore 18 with an internal thread 19. The diameter of the fastener bore in the component 16 is slightly larger than the diameter in the component 17 so that a clamping bolt 20 provided with an external thread can be passed through with its threaded shaft 21. The clamping bolt 20 has a bolt head 22, which in the illustrated embodiment is designed as a hexagon head. The pair of wedge lock washers 1 is inserted between the bolt head 22 and the upper side of the component 16, with its wedge lock washer 2 at the bottom so that it rests with its clamping structures 9 on the upper side of the component 16. The clamping bolt 20 passes through the fastener openings 6, 6.1 of the pair of wedge lock washers 1 with its threaded shaft 21. Before a clamping force is applied, the radial ribs of the larger-diameter wedge lock washer 2 forming the clamping structure 9 rest with their radially outer disk areas 10 on the upper side of the component 16. The clamping arrangement 15 is clamped by means of a clamping tool 23 shown schematically. This has a nut 24 which is torque-locked onto the bolt head 22 of the clamping bolt 20 and with which a torque is applied to the bolt for clamping the clamping arrangement 15 using the clamping tool 23. The clamping tool 23 also has a torque support 25. This is sleeve-shaped and is guided around the outside of the nut 24. Its front end has a structure complementary to the rotary drive contour 7 of the larger-diameter wedge lock washer 2, so that the positive structures of this rotary drive contour engage in the negative structures 8 of the rotary drive contour 7 of the wedge lock washer 2. When the clamping arrangement 15 is tightened, due to the force concentration on the apex 5 of the radial ribs of the wedge lock washer 2 in its radially outer disk area 10, they are pressed into the upper side of the component 16 even at a relatively low clamping force. As a result, even with a low clamping force, a positive connection acting in the circumferential direction of the wedge lock washer 2 and the component 16 is produced. This ensures that the pair of wedge lock washers 1 is not moved in a rotational manner relative to the surface of the component 16 when the clamping bolt 20 is tightened, which is why this wedge lock washer 2 can be effectively used as a reaction washer for the torque support 25 of the clamping tool 13. As the clamping continues, the radial ribs of the wedge lock washer 2 are pressed into the upper side of the component 16, whereby the quality of the form fit is gradually improved as the radial ribs are pressed in more and more.

Figure 9:
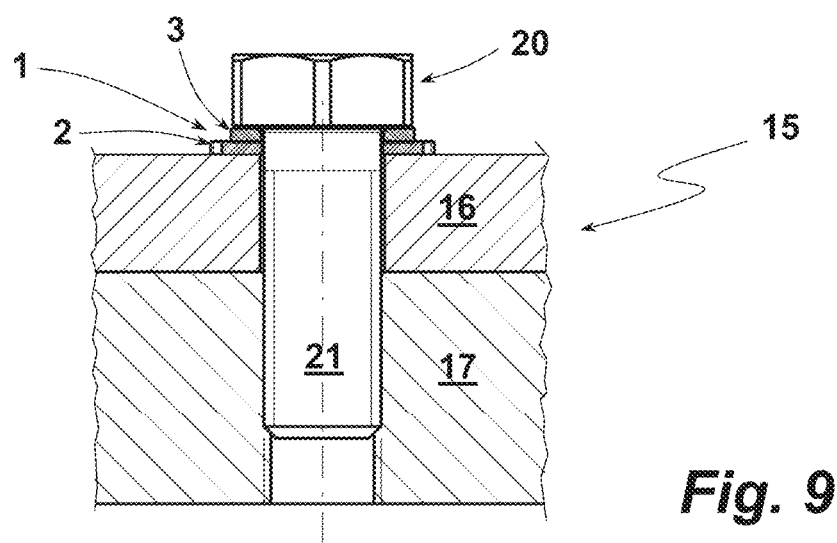
FIG. 9 shows the tensioned clamping arrangement of FIG. 8 with the pair of wedge lock washers.
Figure 10:
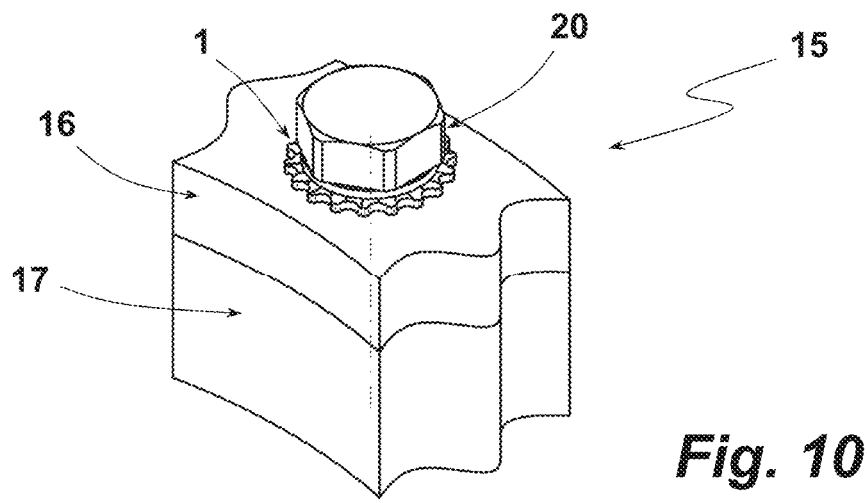
FIG. 10 shows a perspective view of the clamping arrangement of FIG. 9.

The finished clamping arrangement 15 is shown in FIGS. 9 and 10. This clamping arrangement 15 is secured in a special way against loosening or even coming loose by the pair of wedge lock washers 1. This securing is significantly better compared to the securing realized by a one-piece reaction washer, also because an embossing of at least radial sections of the clamping structures 9 into the surface of the component 16 is provided and such clamping structures 9 are not only structures that increase friction in the release direction.

The structuring of the pair of wedge lock washers 1, which can be seen in the figures, by the two wedge lock washers 2, 3 designed with different diameters, also represents a coding for a fitter as to which flat side the pair of wedge lock washers 1 should rest on the side of a component.

Figure 11:
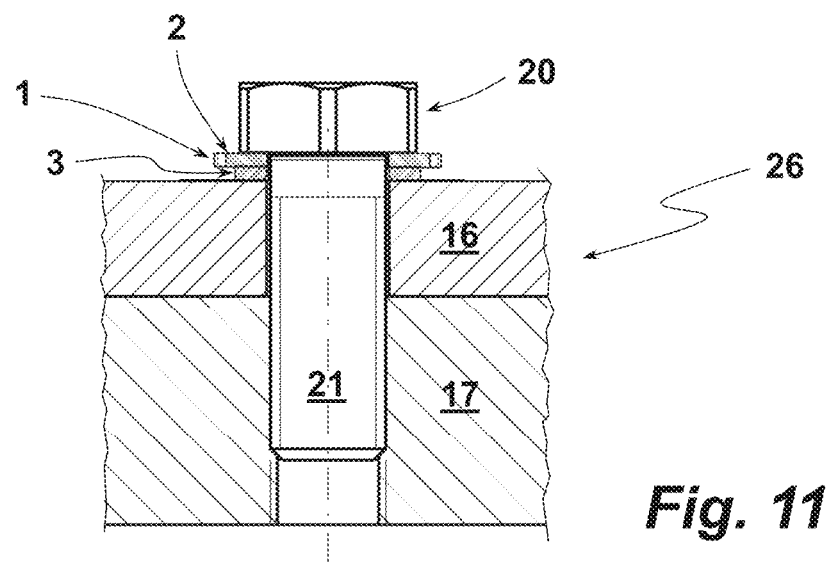
FIG. 11 shows another example clamping arrangement with the pair of wedge lock washers of FIG. 1 in a different use thereof.

Since in the illustrated embodiment the wedge lock washer 3 with the smaller diameter also has a clamping structure 9.1 on the outside, the pair of wedge lock washers 1 can also be inserted into a clamping arrangement in its other possible application. Such a clamping arrangement 26 is shown in FIG. 11. In this clamping arrangement 26, the pair of wedge lock washers 1 with its smaller diameter wedge lock washer 3 is inserted in contact with the upper side of the component 16. Even in this use of the pair of wedge lock washers 1, loosening is effectively prevented. It is sometimes advantageous that the rotary drive contour of the wedge lock washer 2 with the larger diameter is spaced from the upper side of the component 16. An engagement position of the torque support 25 of the clamping tool 23 can then sometimes be facilitated. When using the pair of wedge lock washers 1 as shown in FIG. 11, it is interesting to note that the force required to release the clamping arrangement 26 or the clamping bolt 20 is significantly higher than the force required to properly clamp the clamping arrangement 26. In this respect, the use of the pair of wedge lock washers 1 in an arrangement as shown by way of example in FIG. 11 is useful for applications in which no loosening of the clamping arrangement is intended in principle. In contrast, the pair of wedge lock washers 1 will be used in the orientation shown in FIGS. 8 to 10 if the clamping connection is to be released from time to time.

The invention has been described on the basis of exemplary embodiments. Without departing the scope of the present claims, there are numerous other designs and options for a person skilled in the art to implement the invention, without these having to be shown or explained in more detail in the context of this disclosure.

While several aspects and embodiments have been discussed herein, those persons skilled in the art will recognize numerous possible modifications, permutations, additions, combinations and sub-combinations therefor, without these needing to be specifically explained or shown within the context of this disclosure. The claims should therefore be interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown or described, or portions thereof, but it is recognized that various modifications are possible within the scope of the invention. Thus, it should be understood that although the invention has been specifically disclosed by preferred embodiments and optional features, modification and variation of the concepts herein may be resorted to by those skilled in the art, and that such modifications and variations are considered to be within the scope of this invention as defined by the claims. Whenever a range is given in the specification, all intermediate ranges and subranges, as well as all individual values included in the ranges given are hereby incorporated into this disclosure. When a Markush group or other grouping is used herein, all individual members of the group and all combinations and sub-combinations possible of the group are hereby individually included in this disclosure. In general, the terms and phrases used herein have their art-recognized meaning, which can be found by reference to standard texts, references and contexts known to those skilled in the art. Any above definitions are provided to clarify their specific use in the context of the invention.

LIST OF REFERENCE NUMERALS

1, 1.1 wedge lock washer pair
2, 2.1 wedge lock washer
3, 3.1 wedge lock washer
4, 4.1 wedge surface
5, 5.1 positive apex
6, 6.1 fastener opening
7 rotary drive contour
8 negative structure
9, 9.1, 9.2, 9.3 clamping structure
10 outer disk area
11 disk area
12 inner disk area
13 line
14 line
15 clamping arrangement
16 component
17 component
18 blind bore
19 internal thread
20 clamping bolt
21 threaded shaft
22 bolt head
23 clamping tool
24 nut
25 torque support
26 clamping arrangement
a distance
S apex
$R_1$-$R_3$ radial ribs

The invention claimed is:

1. A pair of wedge lock washers comprising:
a first wedge lock washer and a second wedge lock washer, with the first wedge lock washer having a larger outer diameter than the second wedge lock washer,
wherein the two wedge lock washers each have a fastener opening arranged in alignment with one another,
wherein the two wedge lock washers each have a first washer surface, a second washer surface opposite the first washer surface, and a radial outer side extending between the first washer surface and the second washer surface, the first washer surfaces of the two wedge lock washers being arranged facing one another, wherein, on the first washer surfaces, the two wedge lock washers each have a wedge lock surface structure which engage one another, wherein, on the second washer surfaces, the two wedge lock washers each have clamping structures configured for a form-fitting embossing thereof into a surface of a component adjacent thereto, wherein the first wedge lock washer has a rotary drive contour defining the radial outer side thereof for torque support of a clamping tool, the rotary drive contour being a toothed contour with negative and positive structures, which are located beyond a radial termination of the second wedge lock washer with respect to the radial direction, whereby the first wedge lock washer functions as a reaction washer, wherein the clamping structures of the first wedge lock washer are arranged at least in a radially outer area of the second washer surface extending in the radial direction at an axial distance from a radially inner area of the second washer surface, such that a material thickness of the first wedge lock washer including its clamping structures decreases from the radially outer area in a direction of the fastener opening, wherein apexes of the wedge lock surface structures are arranged as positive structures on the mutually facing first washer surfaces of the two wedge lock washers in each case in a respective plane, and the planes of the first and second washer surfaces of the second wedge lock washer are arranged parallel to one another.

2. The pair of wedge lock washers of claim 1, wherein the outer diameter of the second wedge lock washer extends to an inner diameter of the radially outer area of the first wedge lock washer.

3. The pair of wedge lock washers of claim 1, wherein the radially outer area, which is arranged at an axial distance from the radially inner area, extends approximately 25 to 45% of the radial extension of the first wedge lock washer starting from the edge of the fastener opening.

4. The pair of wedge lock washers of claim 1, wherein the clamping structures are formed as radial ribs.

5. The pair of wedge lock washers of claim 4, wherein the radial ribs extend from an edge region enclosing the fastener opening into a region of the radially outer side of the respective wedge lock washer.

6. The pair of wedge lock washers of claim 4, wherein the radial ribs have an asymmetrical cross-sectional geometry with flatter flanks thereof aligned in opposite directions to wedge surfaces of the wedge lock surface structures respectively structuring the opposite first washer surface of the respective wedge lock washer carrying the radial ribs.

7. The pair of wedge lock washers of claim 4, wherein a first number of radial ribs have a first height and a second number of radial ribs have another height which is less than the first height, and the radial ribs of the first number are separated from one another individually or in groups by at least one radial rib of the second number.

8. The pair of wedge lock washer of claim 7, wherein the second number of radial ribs is composed of radial ribs with at least two different heights.

9. The pair of wedge lock washer of claim 8, wherein, viewed in the circumferential direction of the lock washer, starting from a radial rib of the first number, the radial rib of the first number is followed by two or more radial ribs of the second number of sequentially decreasing height.

10. The pair of wedge lock washer of claim 7, wherein a sequence of radial ribs of varying height is the same in both circumferential directions of the lock washer.

11. The pair of wedge lock washers of claim 1, wherein the two wedge lock washers are each produced by a stamping-pressing process from steel or stainless steel.

12. The pair of wedge lock washers of claim 1, wherein the two wedge lock washers are provided, at least on the first and second washer surfaces thereof, with a zinc flake coating.

13. The pair of wedge lock washers of claim 1, wherein the two wedge lock washers with their engaged wedge lock surface structures are held together in a delivery state by an adhesive connection which is flexible or detachable with respect to a shear stress.

14. A clamping arrangement for clamping at least two components together using a screw fastener, comprising a pair of wedge lock washers according to claim 1, wherein in the clamping arrangement, the first wedge lock washer rests on a surface of one of the components, and the screw fastener with a clamping nut or a head of a clamping bolt rests on the second wedge lock washer, and wherein at least the clamping structures located in the radially outer area of the first wedge lock washer are embossed by a clamping process into the surface of the component resting thereon in a form-fitting manner with respect to the circumferential direction of the first wedge lock washer.

15. A clamping arrangement for clamping at least two components together using a screw fastener, comprising a pair of wedge lock washers according to claim 1, wherein in the clamping arrangement, the second wedge lock washer rests on a surface of one of the components, and the screw fastener with a clamping nut or a head of a clamping bolt rests on the first wedge lock washer, and wherein through such arrangement of the pair of wedge lock washers, a force required for loosening is greater than a force required for tightening the clamping arrangement.

* * * * *